(No Model.) 7 Sheets—Sheet 1.

A. KRUPP.
Mounting and Operating Ordnance.

No. 238,698. Patented March 8, 1881.

Witnesses
Chas. H. Smith
Geo. T. Pinckney

Inventor
Alfred Krupp
per. Lemuel W. Serrell
Atty (No Model.) 7 Sheets—Sheet 2.

A. KRUPP.
Mounting and Operating Ordnance.

No. 238,698. Patented March 8, 1881.

Witnesses
Chas H Smith
Geo. T. Pinckney

Inventor
Alfred Krupp
per Lemuel W Serrell
atty (No Model.) 7 Sheets—Sheet 3.
A. KRUPP.
Mounting and Operating Ordnance.
No. 238,698. Patented March 8, 1881.
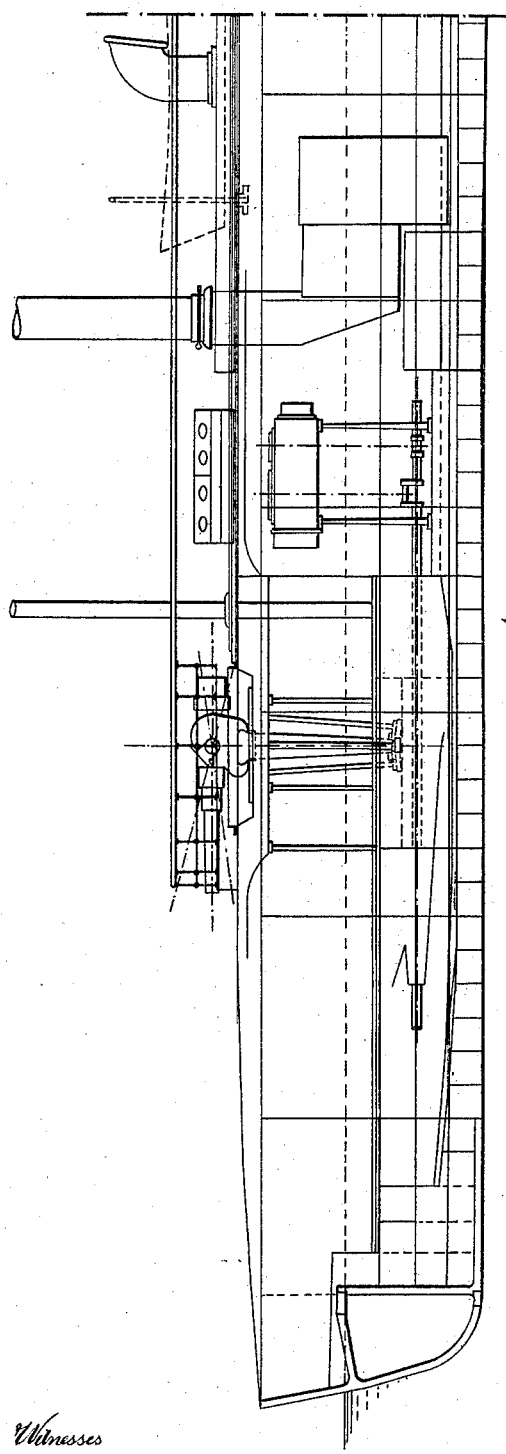
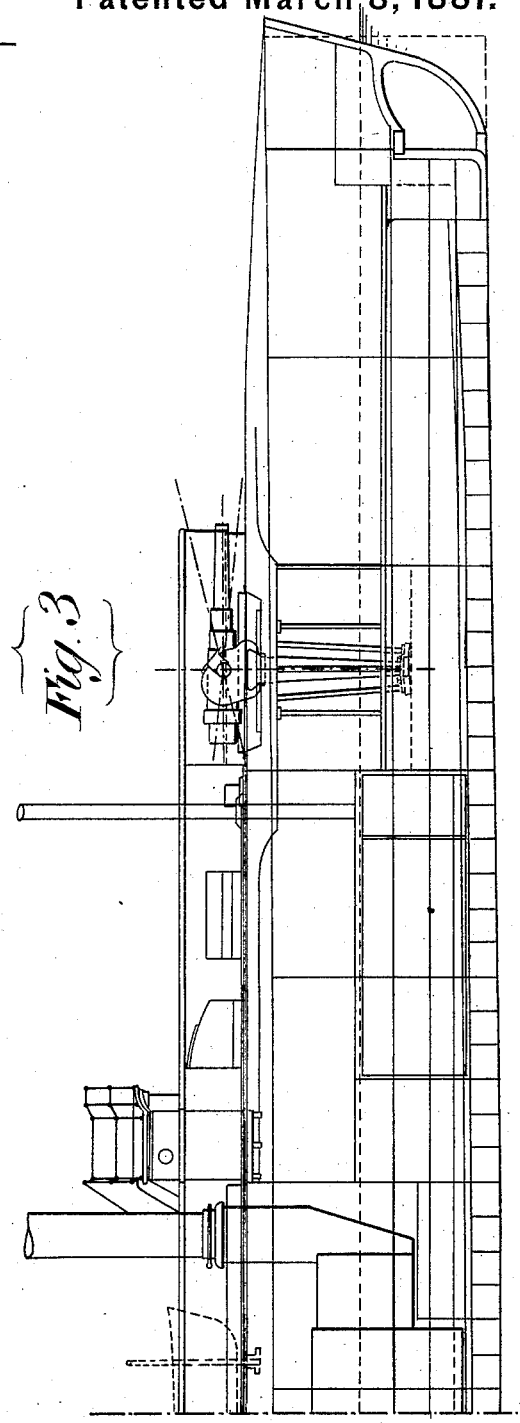
Fig. 3
Witnesses
Chas H Smith
Geo. T. Pinckney
Inventor
Alfred Krupp.
per Lemuel W. Serrell
atty (No Model.) 7 Sheets—Sheet 4.
A. KRUPP.
Mounting and Operating Ordnance.
No. 238,698. Patented March 8, 1881.

Witnesses
Chas H Smith
Geo. V. Pinckney

Inventor
Alfred Krupp
per Lemuel W. Serrell
atty (No Model.)  7 Sheets—Sheet 5.

A. KRUPP.
Mounting and Operating Ordnance.

No. 238,698.  Patented March 8, 1881.

Witnesses  Inventor
Alfred Krupp
per Lemuel W. Serrell
atty (No Model.) 7 Sheets—Sheet 6.
A. KRUPP.
Mounting and Operating Ordnance.
No. 238,698. Patented March 8, 1881.
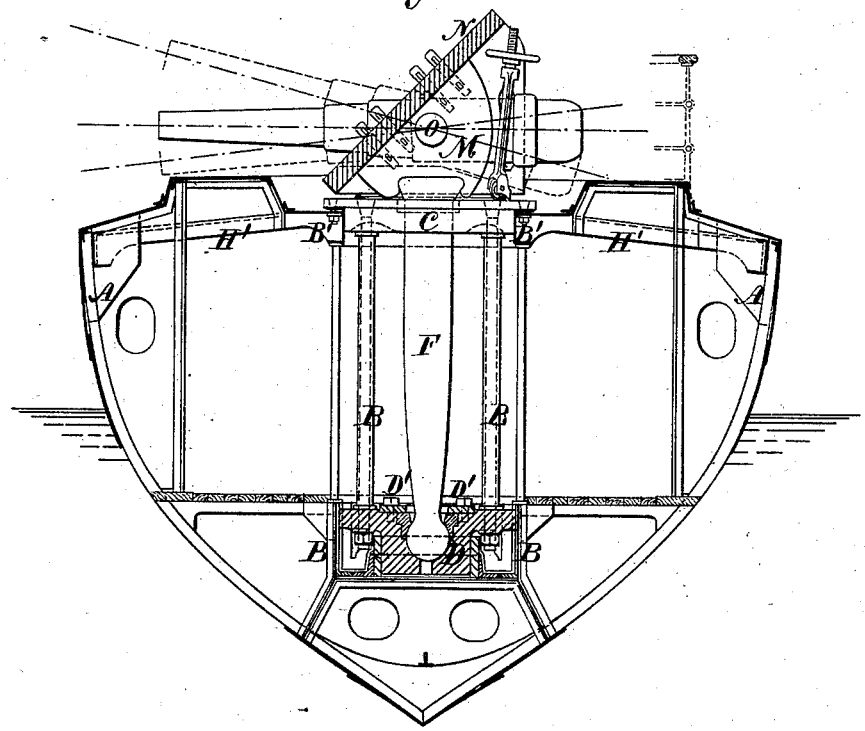
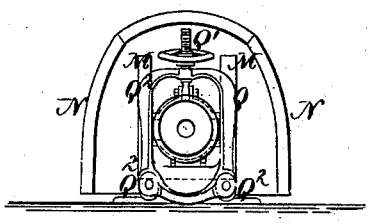

(No Model.)  7 Sheets—Sheet 7.
A. KRUPP.
Mounting and Operating Ordnance.
No. 238,698. Patented March 8, 1881.
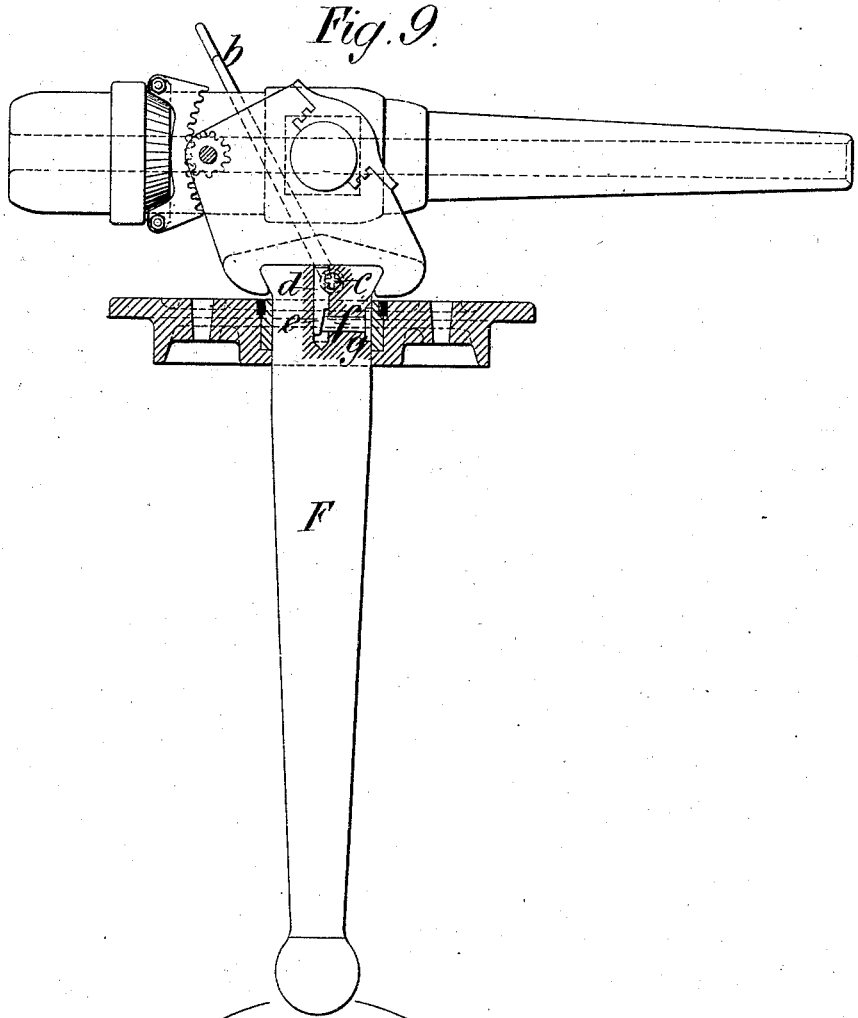
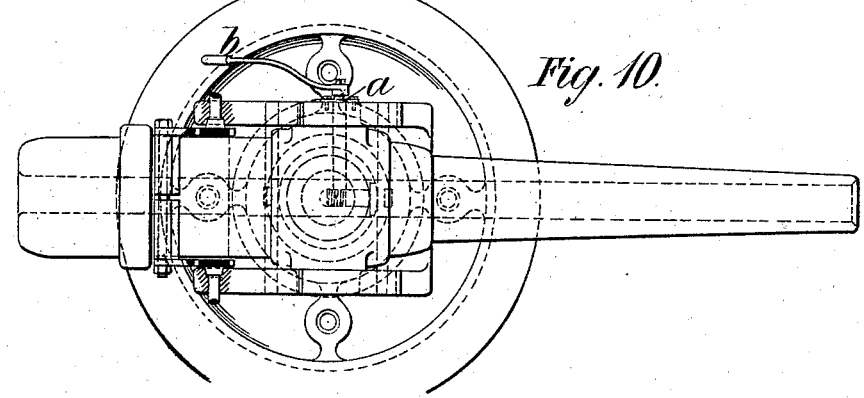

UNITED STATES PATENT OFFICE.

ALFRED KRUPP, OF ESSEN, GERMANY.

MOUNTING AND OPERATING ORDNANCE.

SPECIFICATION forming part of Letters Patent No. 238,698, dated March 8, 1881.

Application filed October 2, 1880. (No model.) Patented in France May 15, 1880.

*To all whom it may concern:*

Be it known that I, ALFRED KRUPP, of Essen, in the German Empire, cast-steel and gun manufacturer, have invented new and useful Improvements in Mounting Ordnance, of which the following is a specification.

The object of this invention is to effect various improvements in the mounting of cannon or ordnance of that class in which the gun-carriage or trunnion bearings are arranged on a vertical shaft capable of being revolved in an upper or neck bearing and in a bottom or step bearing, said bearings being so fixed in the stationary battery or floating battery or vessel as to cause the recoil to be taken up thereby entirely.

One part of this invention consists in rigidly connecting the said two bearings.

Another part consists in constructing the pivot-bearing so as to prevent the shaft from rising vertically when the cannon is fired at a depression.

Another part of my invention refers to the construction and fixing of the upper bearing.

Another part refers to the application of a shield for the protection of the men serving the cannon, and to a sighting appliance.

Other parts relate to an elevating mechanism and to a brake for fixing the shaft in its upper bearing.

Figure 1:
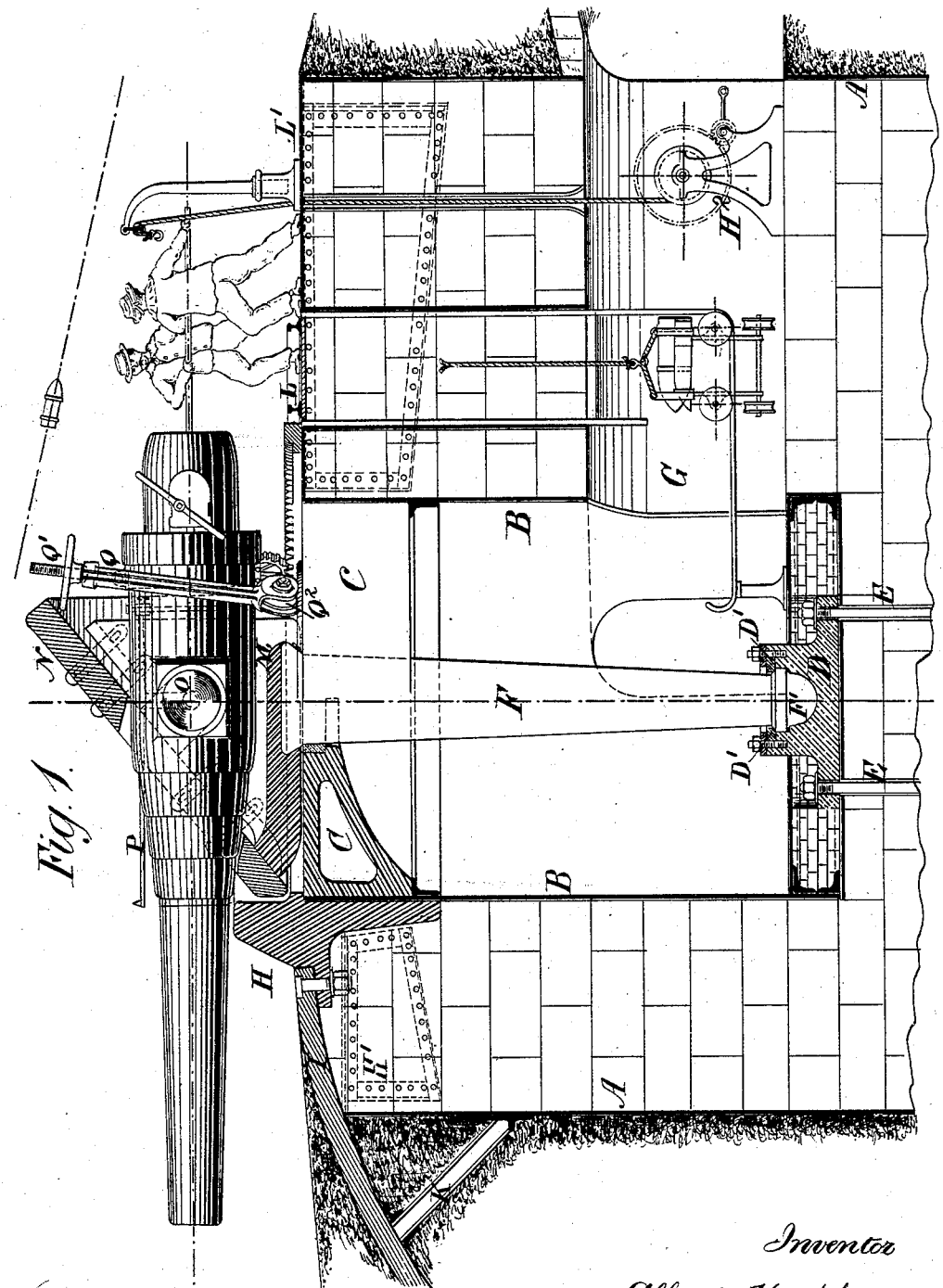
Figure 2:
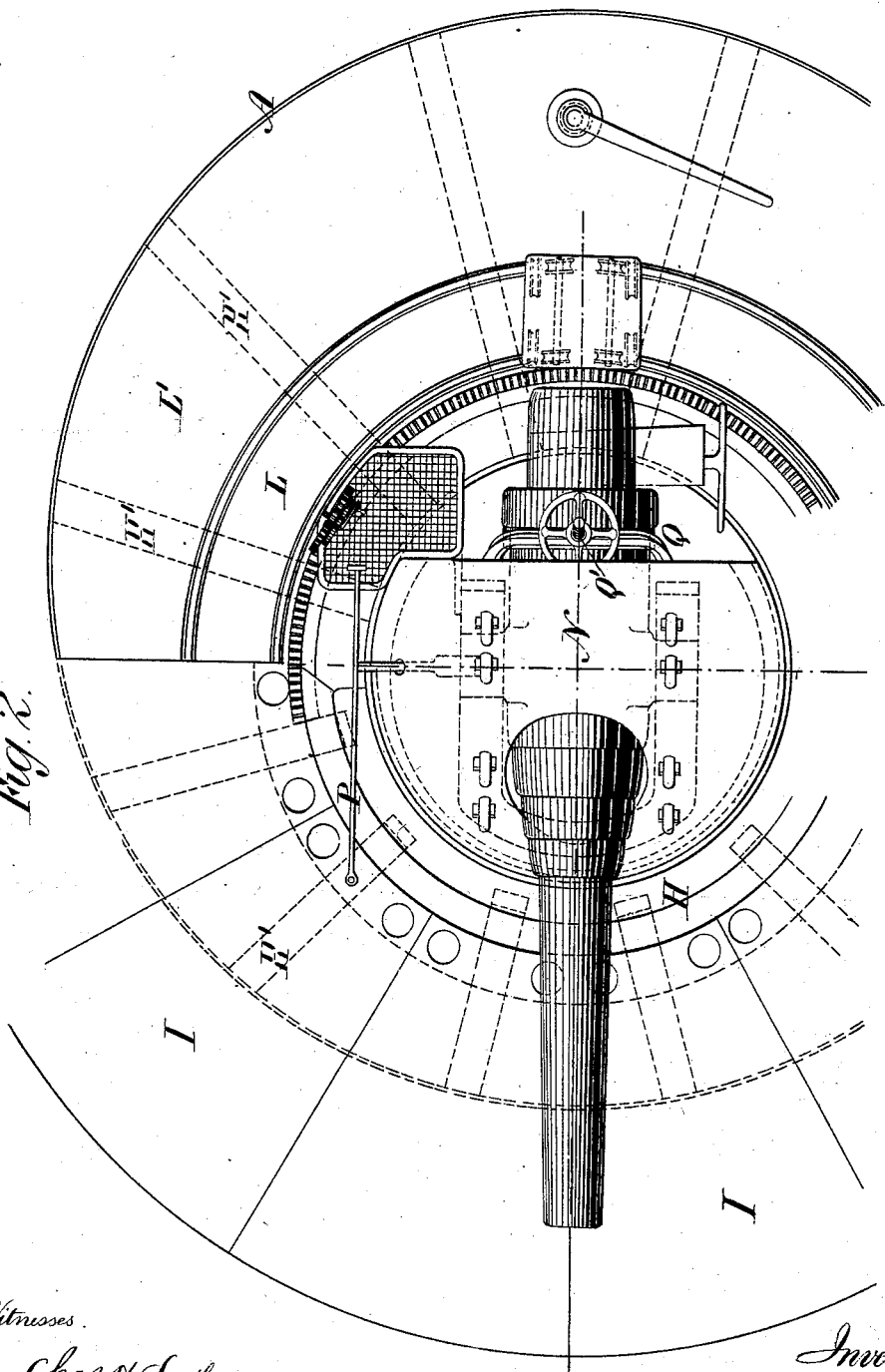

Figure 1 of the accompanying drawings is a vertical section, showing the mode in which I mount a heavy cannon of this class in a land-battery. Fig. 2 is a plan of same.

The foundation consists of heavy masonry, held together by a strong wrought-iron shell or cylinder, A. Inside of the shell or cylinder A, I place another strong wrought-iron cylinder, B, which is placed concentric with the outer cylinder, A, in case the cannon is to be used for all-round firing, or eccentric therewith, as here shown, if the cannon is to have a limited horizontal range. The cylinder B serves to the rigid tying or fixing together of the upper or neck bearing, C, for the vertical shaft F and the lower or pivot bearing, D. The latter rests on the bottom of the cylinder B, as shown. The bearing D and cylinder B are firmly fixed to the foundation by the bolts E. The space around the vertical shaft F is used as an ammunition-store, which is made accessible by a lateral tunnel, G, in which may be placed a winch, $H^3$, for raising projectiles to the cannon. The pivot $F'$ of the shaft F is formed half-round and with a shoulder, which is retained in place by a flange, $D'$, in two halves, and by screws, so that the shaft cannot rise from its bearing if the cannon is fired at a depression; or the same object may be attained by making the pivot of the ball form, which will be described later on with reference to Figs. 5 and 7. The neck-bearing C consists of a strong annular casting. The inner cylinder, B, and the outer shell or cylinder, A, are firmly connected at the top by the segment-ring H, the radial struts and ties $H'$, (shown in dotted lines,) the sector-plates I, and the tubular or angle struts K, also by the floor-plates L and $L'$. It will thus be seen that the recoil transferred to the cylinders B and A is taken up very efficiently by the surrounding earthwork.

In order to protect the men serving the gun, the gun-carriage or trunnion-bearings M may be made to carry a shield, N, fastened thereto by means of bolts and cotters, as shown; or there may be ordinary chilled-iron or other armor partly or wholly around the gun.

The "sight" is here shown at the end of an arm, P, fixed on one of the trunnion-pivots, O, of the cannon, and passing out through the shield N.

The back end of the cannon is carried by a screw, $Q'$, which passes through a nut in the carriage Q, running on wheels $Q^2$, and there is a band around the end of the cannon, the upper or connecting ends of which have lugs $Q^3$, and said lugs, together with the lower end of the screw $Q'$, are bolted together, forming a hinge-joint, which joint allows the relative position of the parts to change as the gun is raised or lowered. This is also shown in Fig. 8 as applied to a ship's gun. By turning the screw $Q'$ one way or the other the gun is raised or lowered, as required, and, moreover, with the advantage that I retain the same elevation after the gun has been fired off.

The cannon is adjusted as to the required horizontal direction, in the ordinary manner, by means of a pinion on the gun carriage or shield gearing with a tooth wheel or segment on the floor or platform L; but in order to fix the cannon in this position, so as to retain the same after the cannon has been fired off, and in order to cause the shaft F to rest firmly against the back of the bearing C' while being fired off, I provide this part of the shaft F with a brake, or, as it may be termed, "wedging appliance," which I have shown separately and to a larger scale as applied to a ship's gun in Figs. 9 and 10; but it should be applied to the cannon shown in Figs. 1 and 2 also, and in the same manner, although for the sake of clearness I have omitted it therefrom.

$a$ is a spindle recessed horizontally into the upper part of the shaft F, and reaching to the center thereof. It is on its outer end fitted with a hand-lever, $b$, and on its inner end with a pinion, $c$, which gears into the teeth formed in the vertical bolt $d$. The latter is formed below with a wedge surface, $e$, which works against a corresponding slanting face of the horizontal bolt $f$. By applying pressure to the lever $b$ the bolt $f$ is made to press against the disk $g$, which bears against the inside of the bearing C in this place, thus jamming the shaft F firmly against it.

Instead of pinion and rack, a screw and nut may evidently be used for forcing the wedge-bolt $d$ down, and for releasing it. The inclination or "draw" of the wedge is so small that it does not shake loose on firing, but a slight pressure on the lever $b$ releases it.

Figure 4:
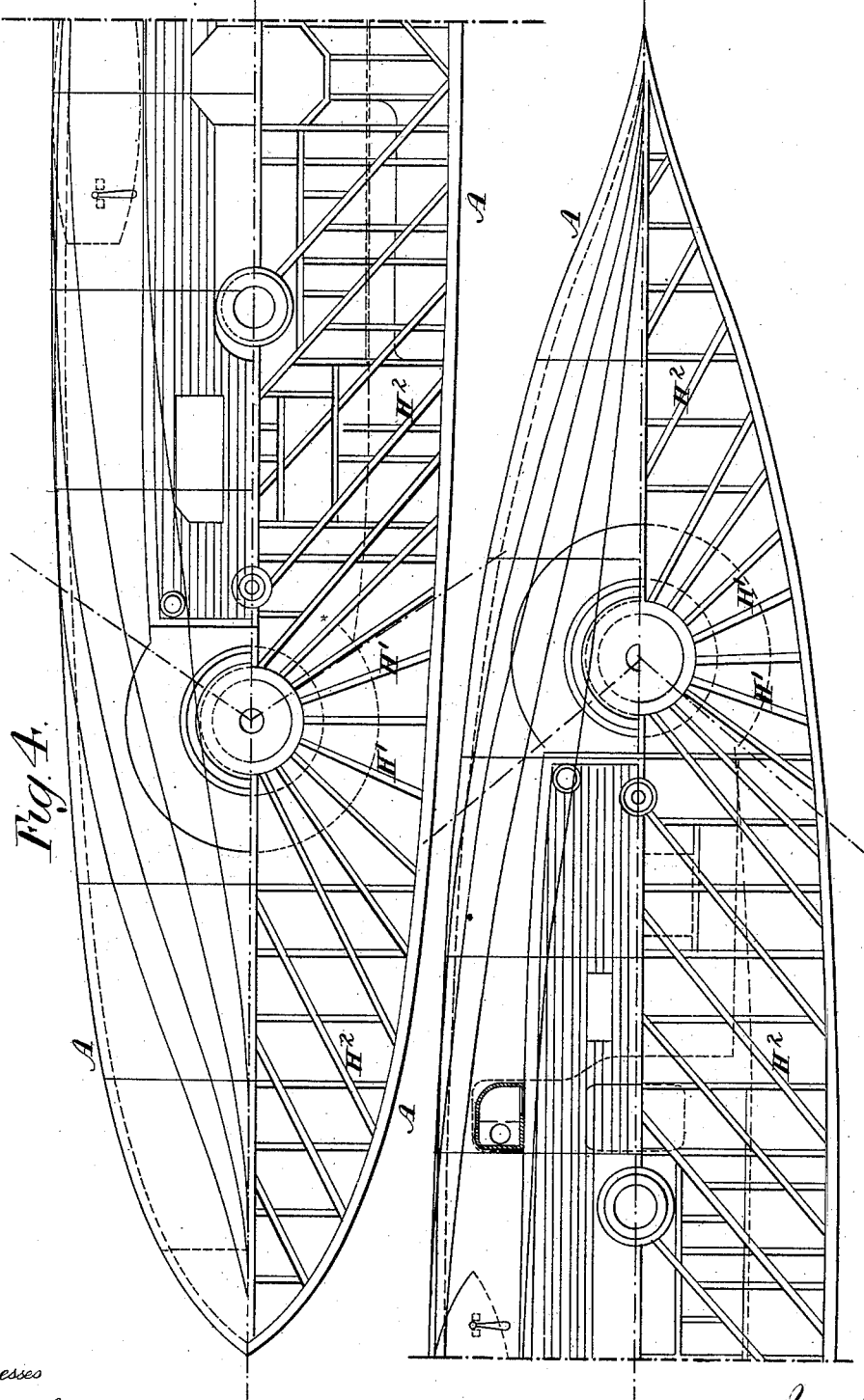
Figure 5:
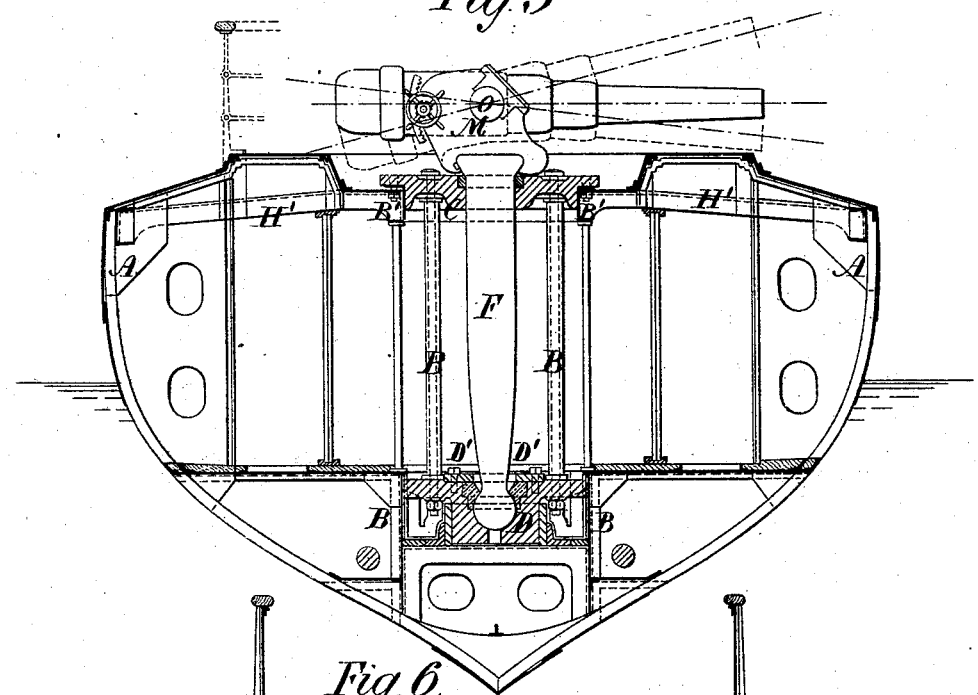
Figure 6:
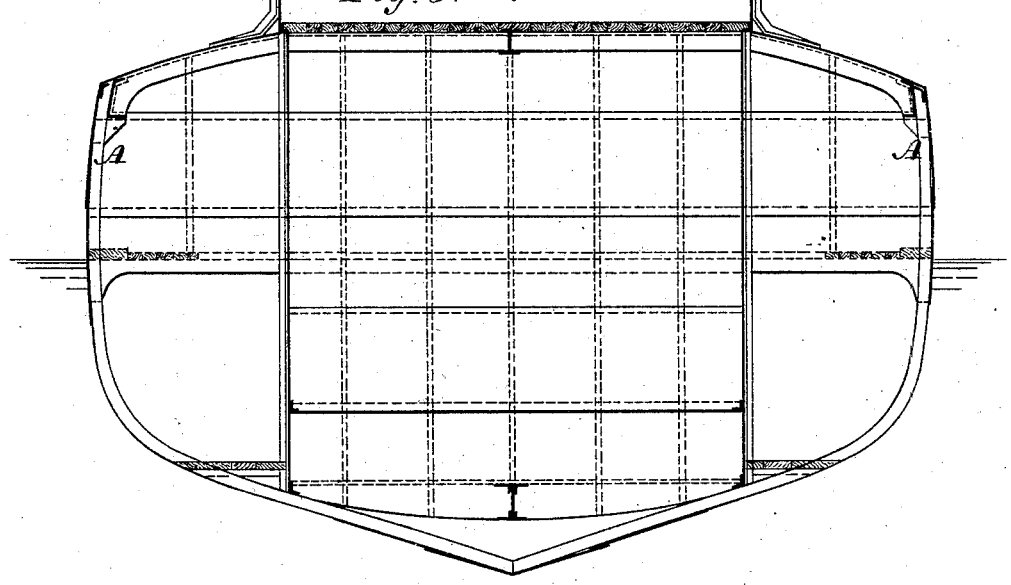

Fig. 3 is a sectional elevation of a gunboat fitted with two cannon according to this invention. Fig. 4 is a plan half deck and half below deck. Fig. 5 is a vertical cross-section at the place of the stern cannon; Fig. 6, a similar section amidship in the stoke-hole, and Fig. 7 a section at the bow cannon. Fig. 8 shows a detail already alluded to. By using two such guns every point of the compass can be swept; but with one cannon this can seldom be attained, because of the work on deck.

The construction of the parts is in all essential features the same as just described for the land-battery gun. Referring to Figs. 5 and 7, it will be seen that the annular neck-bearing C and the pivot-bearing D are rigidly tied or fixed together by four stout tie-bolts, B'', passing through tube-stays; or it might be by a cylinder, B, as in Fig. 1; but I prefer the former for ships. The neck-bearing C enters a cylinder or ring, B', which partly takes the place of the cylinder B, Fig. 1; in fact, it is the same part to which the radial struts and ties H' are fixed. These latter, in this instance, also run off in radial directions, and are at their other ends firmly secured to the ship's sides or shell A. The struts which run fore and aft are again, by slanting struts H², connected indirectly with the ship's sides or shell A. I thus distribute the shock from the recoil over the whole ship. The pivot-bearing is fitted in a cylinder, B, or other part of the ship.

The pivot part of the shaft F is of spherical form, as shown, the bearing being in two parts, D and D', held together by screws, so that the pivot cannot rise from its bearing if the cannon is fired at an elevation; or the same object may be attained by making this pivot with the shoulder shown and described with reference to Figs. 1 and 2.

In Fig. 7 I have shown a protecting-shield, N, fastened to the gun-carriage or trunnion-bearing M.

Instead of the elevating-gear shown at Figs. 7 and 8, and already described, any ordinary well-known elevating-gear—such as that shown at Fig. 5 and at Figs. 9 and 10—may be used.

The shaft F is at the neck-bearing provided with the brake already described with reference to Figs. 9 and 10.

The sighting appliance and the appliance for laying the gun in the horizontal direction may be as described with reference to the land-battery gun.

Having thus described and ascertained the nature of this invention and how the same is or may be carried into effect, I declare that I claim—

1. A gun-battery consisting of a ship or structure in which a cylinder, B, is united to the outer sides or shell, A, by means of stays or struts H', the said cylinder containing a neck-bearing, C, for a vertical shaft, F, which latter rests in a pivot-bearing on the bottom of the cylinder B, and carries the gun-trunnion bearings, substantially as set forth.

2. A gun-battery consisting of a ship or structure in which a ring, B', is united to the outer sides or shell, A, by means of struts or ties H' and H², the said ring B' containing the neck-bearing for a vertical pivoted shaft, F, which carries the gun-trunnion bearings, substantially as set forth.

3. The protected revolving gun-carriage proper, or the part containing the trunnion-bearing, consisting of the bottom and sides M, secured to the shaft F, in combination with the slanting shield N on a breech-loading gun, the back end of which, behind the trunnions, is provided with means for elevating it, substantially as set forth.

4. The brake or appliance for fixing and holding in position, laterally, a pivot-mounted gun, consisting in the vertical sliding wedge-bolt $d$, in combination with the horizontal sliding bolt $f$, for pressing the disk $g$ against the neck-bearing, substantially as set forth.

5. The elevating appliance, consisting of a screw, Q', which is connected to a lug, $Q^3$, on the back end of the gun, so that the said back end hangs therein, and which screw works through a boss in a carriage, Q, and has a hand-wheel, $Q^4$, which forms the nut for the screw and serves to raise and lower the gun to any required position, in which it is retained after being fired off, substantially as set forth.

In testimony whereof I have hereunto set my hand.

ALFRED KRUPP.

Witnesses:
ALFRED LONGSDON,
JOHANNES PIEPER.